(12) United States Patent
Uchida

(10) Patent No.: US 7,660,033 B2
(45) Date of Patent: Feb. 9, 2010

(54) ELECTROPHORETIC DISPLAY DEVICE AND ELECTRONIC APPARATUS

(75) Inventor: Masami Uchida, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/414,134

(22) Filed: Mar. 30, 2009

(65) Prior Publication Data

US 2009/0185260 A1    Jul. 23, 2009

Related U.S. Application Data

(62) Division of application No. 11/616,420, filed on Dec. 27, 2006, now Pat. No. 7,551,345.

(30) Foreign Application Priority Data

Dec. 28, 2005  (JP)  ............................. 2005-377772
Nov. 2, 2006   (JP)  ............................. 2006-298805

(51) Int. Cl.
    G02B 26/00     (2006.01)
(52) U.S. Cl. .......................... 359/296; 345/84; 345/107
(58) Field of Classification Search ................. 359/296; 345/84, 107
    See application file for complete search history.

(56) References Cited

U.S. PATENT DOCUMENTS 6,982,178 B2 *   1/2006  LeCain et al. ................ 345/107
2003/0021005 A1  1/2003  Liang et al.
2004/0165252 A1 * 8/2004  Liang et al. ................. 359/296
2005/0146774 A1 * 7/2005  LeCain et al. ............... 359/296
2005/0146776 A1 * 7/2005  Kanbe ......................... 359/296
2006/0291034 A1 12/2006  Patry et al.

FOREIGN PATENT DOCUMENTS

JP    06-203954    7/1994
JP    11-236538    8/1999

* cited by examiner

Primary Examiner—Evelyn A. Lester
(74) Attorney, Agent, or Firm—Harness, Dickey & Pierce, P.L.C.

(57) ABSTRACT

An electrophoretic display device includes a display element including a pair of first and second substrates which are opposed to each other, and a microcapsule enclosing a display material changed in optical characteristics in response to an electric impulse, the microcapsule being sandwiched between the first and second substrates; and a protective film sealing the display element. In the display device, a first electrode is provided on the surface of the first substrate which faces the second substrate, a second electrode is provided on the surface of the second substrate which faces the first substrate, and a spacer is provided in the space between the periphery of the facing surface of the first substrate and the first electrode.

10 Claims, 8 Drawing Sheets

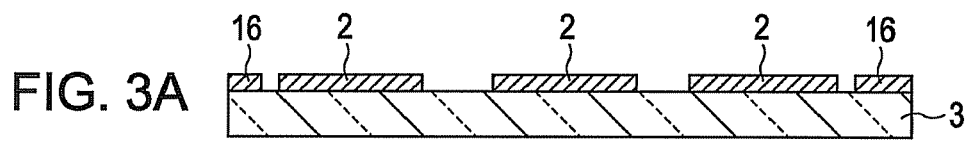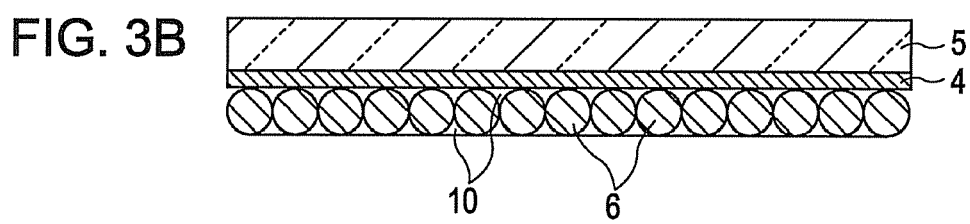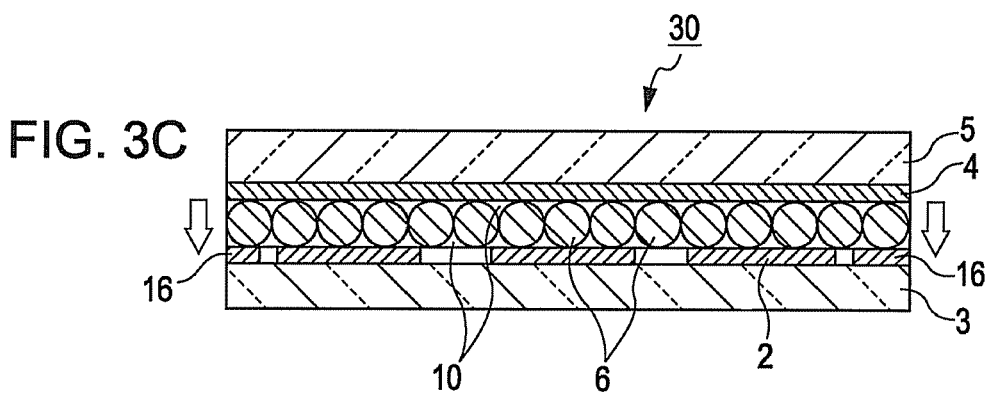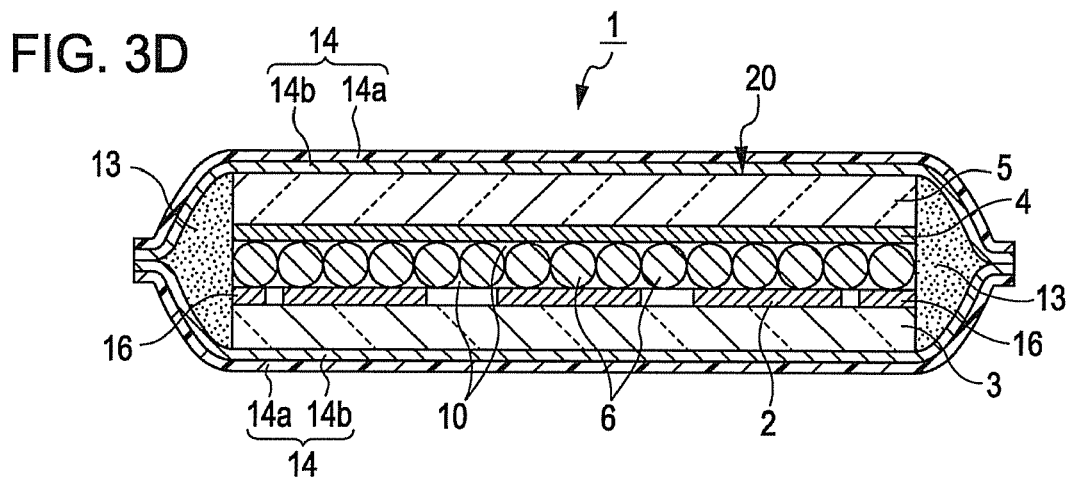

ELECTROPHORETIC DISPLAY DEVICE AND ELECTRONIC APPARATUS

CROSS-REFERENCE TO RELATED APPLICATIONS

This application is a divisional patent application of U.S. Ser. No. 11/616,420 filed Dec. 27, 2006, claiming priority to Japanese Patent Application Nos. 2005-377772 filed Dec. 28, 2005 and 2006-298805 filed Nov. 2, 2006, all of which are hereby incorporated by reference.

BACKGROUND

1. Technical Field

The present invention relates to an electrophoretic display device and an electronic apparatus.

2. Related Art

There have been known electrophoretic display devices each including an electrophoretic dispersion liquid containing a liquid phase dispersion medium and electrophoretic particles and using the phenomenon that when an electric field is applied, the dispersion state of the electrophoretic particles is changed to change the optical characteristics of the electrophoretic dispersion liquid (refer to, for example, Japanese Unexamined Patent Application Publication No. 6-203954). Such electrophoretic display devices may be decreased in cost and thickness due to no need for backlight. Furthermore, the electrophoretic display devices have a wide angle of view, high contrast, and display memory, and thus the electrophoretic display device attract attention as next-generation display devices.

A known example of such electrophoretic display devices includes an electrophoretic dispersion liquid enclosed in microcapsules which are held between a transparent substrate having a transparent electrode, for example, serving as a common electrode and a substrate having pixel electrodes. The enclosure of the electrophoretic dispersion liquid in microcapsules has the advantage that it may be possible to prevent flow out of the dispersion liquid in a process for manufacturing a display device and to decrease sedimentation and aggregation of electrophoretic particles.

On the other hand, a microcapsule-type electrophoretic device is disadvantageous in that when moisture or the like enters a microcapsule display layer from the outside, the electric conductivity of the display layer is increased to degrade the display function.

Therefore, in order to improve the moisture resistance of an electrophoretic display device, there has been widely used a method in which a waterproof film (waterproof sheet) is attached to the outer periphery of a body of an electrophoretic display device, for preventing the moisture entrance into a display layer of the electrophoretic display device.

For example, Japanese Unexamined Patent Application Publication No. 6-203954 discloses a method of bonding a back protecting material, by a vacuum lamination method, to an electroluminescence layer in which a transparent electrode, a luminescent layer, a dielectric layer, and a back electrode are laminated in that order on a light transmitting substrate.

Japanese Unexamined Patent Application Publication No. 11-236538 discloses a method of thermally pressure-bonding a hot melt film having a buffer adhesive layer, with a roll laminator or the like, to the upper surface (light receiving surface) of a laminated member such as a solar cell sheet and at least one of the surfaces of a resin base material having transparency and heat resistance.

In bonding a waterproof film to a body of an electrophoretic display device by the vacuum laminator or roll laminator method, constant temperature and pressure are applied.

When a display electrode is formed on a substrate, a certain space is provided between the display electrode and the peripheral edge of the substrate, for securing some degree of margin. Since the display electrode is not formed in the space, a step is formed by the display electrode.

When a waterproof film is attached to the periphery of such an electrophoretic display device body by the vacuum laminator method, temperature and pressure are applied to the electrophoretic display device body, and thus the substrate is deformed by bending due to the step formed in the space at the periphery of the substrate. The deformation of the substrate causes high stress to be applied to the peripheral portion of the substrate as compared with the other regions. Therefore, the microcapsules disposed in the periphery of the substrate are crushed to bring about the problem of causing a display defect in the periphery of a display region (refer to FIG. 9).

SUMMARY

An advantage of some aspects of the invention is that the invention provides an electrophoretic display device capable of avoiding crush of microcapsules in bonding a waterproof film, thereby preventing a display defect, and also provides an electronic apparatus.

In accordance with an embodiment of the invention, an electrophoretic display device includes a display element including a pair of first and second substrates which are opposed to each other, and microcapsules enclosing a display material changed in optical characteristics in response to an electric impulse, the microcapsules being sandwiched between the first and second substrates, and a protective film sealing the display device. In the display device, a first electrode is provided on the surface of the first substrate which faces the second substrate, a second electrode is provided on the surface of the second substrate which faces the first substrate, and a spacer is provided in the space between the periphery of the facing surface of the first substrate and the first electrode.

Since the space is provided in the periphery of the first electrode, the step formed by the first electrode the substrate surface on which the first electrode is not provided is relieved by the spacer. Accordingly, the space between the microcapsules disposed in the periphery between the pair of substrates and the first substrate (or the second substrate) is filled with the spacer. Therefore, in sealing the display element with the protective film, the peripheral region of the first substrate (or the second substrate) is supported by the spacer and the microcapsules, thereby decreasing the concentration of stress in the peripheral region of the substrate when the protective film is compressed (drawing). Therefore, the substrate peripheral region is not deformed, and crush of the microcapsules disposed in the peripheral region between the first and second substrates can be prevented, thereby preventing a display defect in the periphery of a display region.

It is preferable that the thickness of the spacer is in the range of 50% to 150% of the thickness of the first electrode.

When the thickness of the spacer is over 150% of the thickness of the first electrode, the peripheral portion of the first substrate is higher than the central portion thereof, and thus the cell gap between the pair of substrates become non-uniform. On the other hand, when the thickness is less than 50%, the step formed by the first electrode and the substrate surface is increased, thereby increasing the deformation of the substrate periphery and concentrating stress in the substrate periphery.

It is also referable that the width of the spacer measured in the radial direction of the periphery is 2 times or more as large as the diameter of the microcapsules. When the width of the spacer is less than 2 times as large as the diameter of the microcapsules, if a mother sheet on which the microcapsules have been applied is cut into a required size at a position corresponding to a portion of the microcapsules, some of the microcapsules are crushed, and thus a segment electrode portion does not function to protect the microcapsules. In the embodiment of the invention, even when the microcapsules on a dummy pattern are crushed, the microcapsules on the segment electrodes for display can be prevented from being crushed.

It is further preferable that the width of the spacer is 3 mm or less. This is because when the width of the spacer exceeds 3 mm, the width of a non-display region is limited to 5 mm or less (requirement of product side), and the spacer excessively extends in a seal area having a seal width of 1.5 to 2.0 mm, thereby causing reliability defect. In the embodiment of the invention, it may be possible to decrease the total of the seal width as the width of the non-display region and the spacer width and thus to comply with an application in which the display device is incorporated into a product strongly required to have a good-looking small size.

It is further preferable that the first electrode is a pixel electrode, the second electrode is a common electrode, the pixel electrode includes a plurality of segment electrodes arranged in a predetermined pattern, and the spacer is provided in the periphery of the outer segment electrodes among the plurality of segment electrodes.

The pixel electrode is a so-called segment type including a plurality of segment electrodes arranged in a predetermined pattern.

In this case, in a segment-type pixel electrode, the spacer is provided along the periphery of the outer segment electrodes, and thus the step formed by the pixel electrode and the substrate surface is filled with the spacer. Therefore, it may be possible to decrease concentration of stress in the peripheral edges of the substrates during compression (drawing) of the protective film and to resolve a display defect in the periphery of the display region.

It is further preferable that the spacer is composed of the same material as that of the pixel electrode.

In this case, the space is composed of the same material as that of the pixel electrode, and thus the material cost is decreased. In addition, the space may be formed in the same process as that for the pixel electrode, and thus a process for forming the space need not be added.

It is further preferable that the first substrate has a projecting portion projecting from the outer shape of the second substrate, terminals are provided in the projecting portion, an insulating film is provided on the projecting portion except on at least the terminals, and the spacer is composed of the same material as that of the insulating film.

The insulating film is used as a mask for preventing a bonding member used for connecting the terminal portion of the projecting portion to a circuit board from being disposed on an unnecessary portion (for example, between terminals).

In this case, the insulating film provided on the projecting portion is composed of the same material as that of the spacer, thereby decreasing the material cost. In addition, the spacer may be formed in the same process as that for the insulating film, and thus a process for forming the spacer need not be added.

It is further preferable that a reinforcing member is provided on the surface of at least one of the first and second substrates, which is opposite to the facing surface, so that the reinforcing member planarly overlaps at least a portion of the spacer on the facing surface of the first substrate.

In this case, the reinforcing member is provided on the surface opposite to the facing surfaces of the first and second substrates so that the reinforcing member overlaps the spacer provided on the facing surface side. Therefore, the thickness of the substrate peripheral portion is increased, thereby increasing rigidity. It may be possible to decrease the concentration of stress in the substrate periphery in compression of the protective film and thus prevent the deformation of the substrate periphery.

It is further preferable that the reinforcing member includes at least one of a conductive member composed of the same material as that of the pixel electrode provided on the facing surface side of the first substrate and a protective member composed of the same material as that of the insulating film.

In this case, the reinforcing member is composed of the same material as that of the pixel electrode provided on the facing surface side of the first substrate or the insulating film, thereby decreasing the material cost.

The reinforcing member may be formed in a single layer of a conductive member or an insulating film or a laminated structure including two layers of a conductive member and an insulating film. When the reinforcing member is formed in a laminated structure, it is preferable that the protective member is formed to cover the conductive member. The reinforcing member having a two-layer structure including the conductive member and the protective member improves the rigidity of the substrates as compared with a single layer.

In another embodiment of the invention, an electronic apparatus includes the above-described electrophoretic display device.

Since the electronic apparatus includes the electrophoretic display device causing no display defect, the electronic apparatus has high reliability and high quality.

BRIEF DESCRIPTION OF THE DRAWINGS

The invention will be described with reference to the accompanying drawings, wherein like numbers reference like elements.

FIGS. 3A to 3D are sectional views showing a process for manufacturing an electrophoretic display device.

DESCRIPTION OF EXEMPLARY EMBODIMENTS

First Embodiment

The present invention will be described in detail below.

Figure 1:
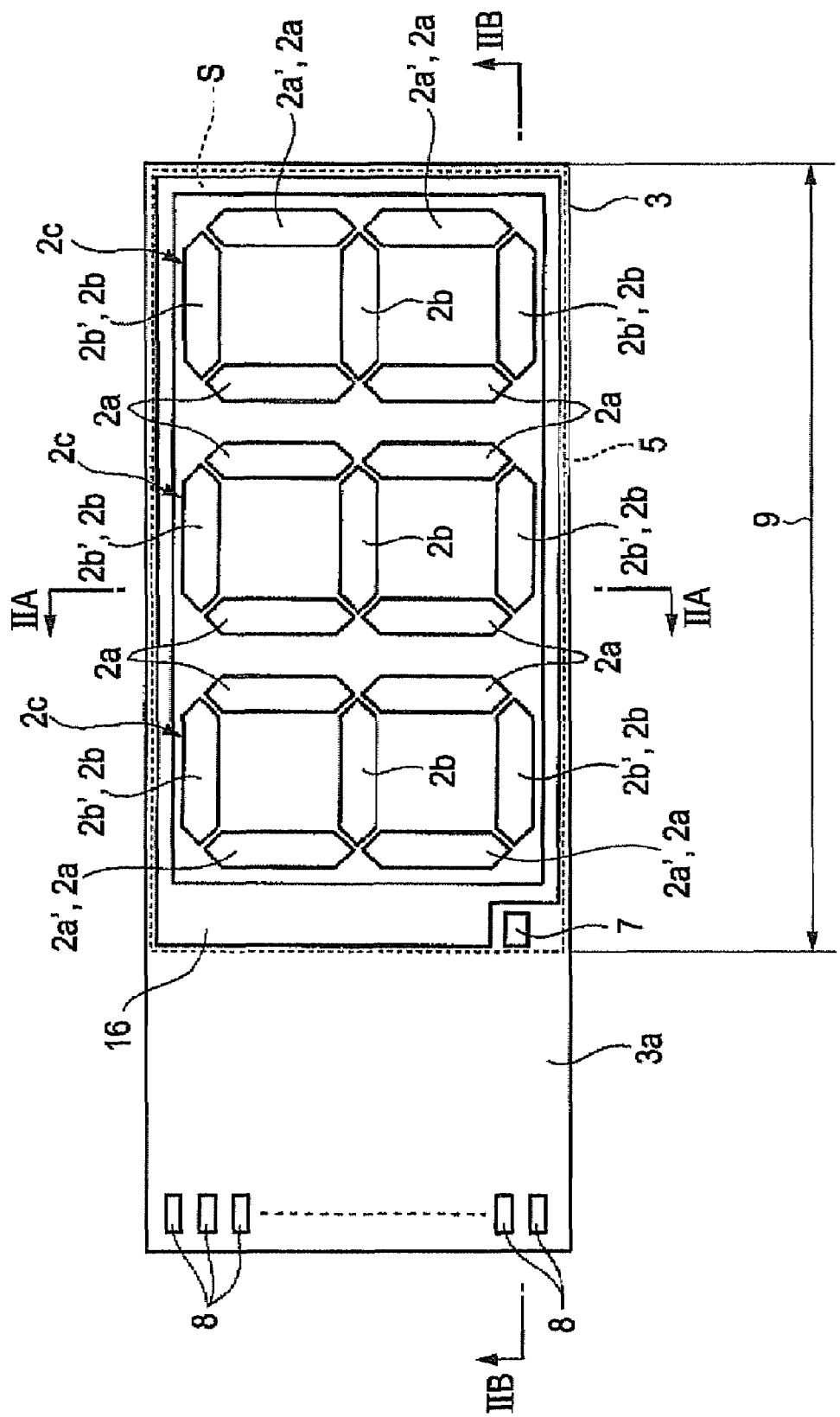
FIG. 1 is a plan view showing the schematic configuration of an electrophoretic display device according to a first embodiment of the invention.

FIG. 1 shows an electrophoretic display device according to an embodiment of the invention. In FIG. 1, reference numeral 1 denotes an electrophoretic display device.

Figure 2A:
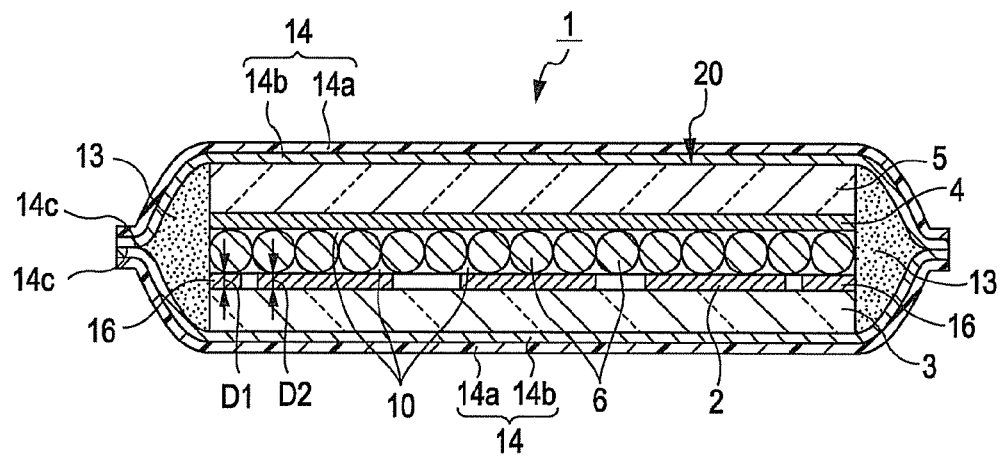
FIG. 2A is a sectional view of the electrophoretic display device taken along line IIA-IIA in FIG. 1.
Figure 2B:
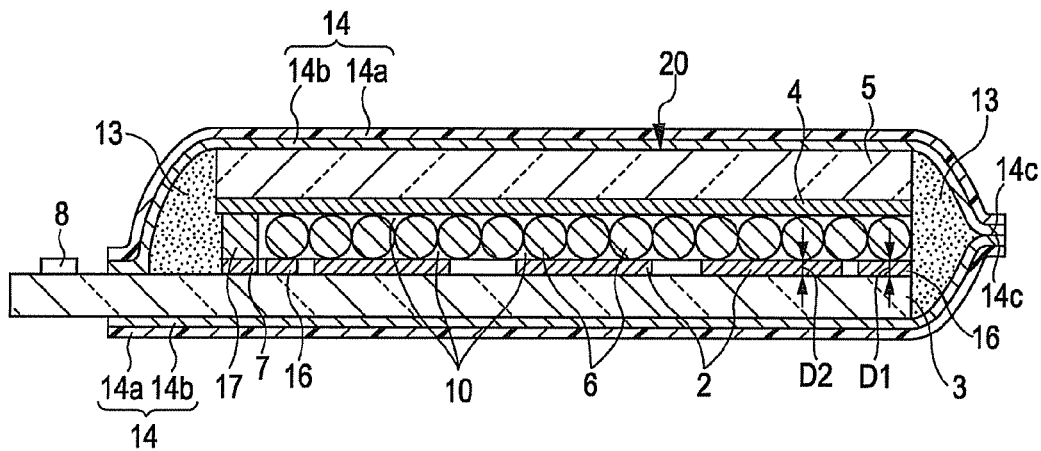
FIG. 2B is a sectional view of the electrophoretic display device taken along line IIB-IIB in FIG. 1.

FIG. 2A is a sectional view of the electrophoretic display device 1 taken along line IIA-IIA in FIG. 1. FIG. 2B is a sectional view of the electrophoretic display device 1 taken along line IIB-IIB in FIG. 1. In each of the drawings used for description below, the scales of layers and members are different for showing the layers and members in respective recognizable sizes. In this embodiment, the opposing surfaces of first and second substrates 3 and 5 are referred to as "the inner surfaces", and the surfaces opposite to the inner surfaces are referred to as "the outer surfaces".

(Electrophoretic Display Device)

As shown in FIGS. 2A and 2B, the electrophoretic display device 1 includes a display element 20 and waterproof sheets 14 (protective film) covering the outside of the display element 20.

The display element 20 includes the first substrate 3 having a plurality of pixel electrodes (first electrodes) 2 and the second substrate 5 having a common electrode (second electrode) 4, both substrates being opposed to each other, and microcapsules 6 each enclosing a display material changed in optical characteristics in response to an electric impulse, the microcapsules 6 being held between the substrates 3 and 5.

In particular, when the electrophoretic display device 1 is used for an IC card or an electronic paper which is required to be flexible, a rectangular film- or sheet-shaped resin substrate is used as each of the first and second substrates 3 and 5. On the other hand, when the electrophoretic display device is used for a general panel not required to be flexible, a glass substrate, a hard resin substrate, or a semiconductor substrate composed of silicon is used.

In this embodiment, the second substrate side corresponds to a display side on which an image is visible by an observer. Therefore, a transparent material having high light transmissivity is used as the second substrate 5 on the observer side of the electrophoretic display device 1. Preferred examples of a material of such a resin substrate include polyethylene terephthalate (PET), polyether sulfone (PES), polyimide (PI), and polyethylene (PE). The thickness of the second substrate 5 is preferably, for example, 100 μm or more. In this case, it may be possible to secure the rigidity of the second substrate 5 and prevent crush of the microcapsules 6 in bonding the waterproof sheets 14.

On the other hand, the first substrate 3 which does not serve as a display surface and which is opposed to the second substrate 5 need not be transparent (high transmissivity). Therefore, besides the materials used for the second substrate 5, polyesters such as polyethylene naphthalate (PEN), polystyrene (PS), polypropylene (PP), polycarbonate (PC), polyether ether ketone (PEEK), and acrylic or polyacrylate resins may be used.

In this embodiment, the outside dimensions of the first substrate 3 are larger than those of the second substrate 5.

When the first substrate 3 and the second substrate 5 are disposed so that the three sides (the upper, lower, and right sides in FIG. 1) of one of the substrates are aligned with the respective three sides of the other, the remaining side of the first substrate 3 projects from the remaining side of the second substrate 5 (the left side in FIG. 1). In this embodiment, the portion of the first substrate 3 which projects from the second substrate 5 is referred to as a "projecting portion 3a".

As shown in FIG. 1, terminals 8 on which a flexible substrate (not shown) is mounted, and lead wiring (not shown) extending from the pixel electrodes 2 and a conductive portion 7 of the first substrate 3 to the respective terminals 8 are formed on the projecting portion 3a of the first substrate 3.

The pixel electrodes 2 and the dummy electrode 16 formed in the display region 9 of the first substrate 3 will be descried in detail below.

A plurality of pixel electrodes 2 designed to a predetermined shape is formed in the display region 9 of the first substrate 3. In this embodiment, the pixel electrodes 2 include seven segment electrodes 2a and 2b each of which has an elongated hexagonal shape and which are arranged in an 8-like form (so-called seven segments). The segment electrodes 2a are arranged so that the long side direction is parallel to the short side direction of the first substrate 3. The segment electrodes 2b are arranged so that the long side direction is parallel to the long side direction of the first substrate 3.

In this embodiment, an assembly of the seven segment electrodes 2a and 2b is referred to as a "segment electrode group 2c". Therefore, one segment electrode group 2c enables the display of a number from 0 to 9. In this embodiment, three segment electrode groups 2c are arranged for displaying a three-digit number. However, the number of segment electrode groups 2c is not limited to three.

In addition, a dummy electrode 16 (spacer) is formed in the space S between the outer segment electrodes 2a' and 2b' in the three segment electrode groups 2c and the three sides (outer edge) of the first substrate 3. The dummy electrode 16 has a predetermined thickness and functions as a spacer filling in the step formed by the segment electrodes 2a and 2b and the first substrate 3. The dummy electrode 16 is formed to surround the three segment electrode groups 2c. In this case, the dummy electrode 16 is provided with a space of, for example, 50 μm from the segment electrodes 2a' to secure insulation between the dummy electrode 16 and the segment electrodes 2a'. Furthermore, the dummy electrode 16 is formed to extend to a position overlapping each of the sides (peripheral edge) of the first substrate 3 to form no clearance (space).

On the projecting portion side of the first substrate 3, the dummy electrode 16 is formed in a display region 9 of the first substrate 3 inside the left side of the second substrate 5 opposed to the first substrate 3. As shown in FIG. 1, the dummy electrode 16 is formed with a space from the conductive portion 7 for vertical conduction between the first and second substrates 3 and 5. Therefore, the dummy electrode 16 is formed with a space from the segment electrodes 2a and 2b and the conductive portion 7 to assume a state where a voltage is released.

In addition, the dummy electrode 16 is formed using the same material in the same process as that for the segment electrodes 2a and 2b formed on the inner surface of the first substrate 3. The dummy electrode 16 includes a copper foil pattern or a conductive material such as aluminum (Al) or the like. In this case, as shown in FIG. 2, the thickness D1 of the dummy electrode 16 is preferably 30% to 180% and more preferably 50% to 150% of the thickness D2 of the segment electrodes 2a and 2b. This is because when the thickness D1 of the dummy electrode 16 is excessively large, the ends of the substrate is higher than the central portion thereof, thereby providing a nonuniform cell gap between the substrates 3 and 5. On the other hand, when the thickness D1 of the dummy electrode 16 is excessively small, the step formed by the segment electrodes 2a and 2b and the substrate surface is increased, thereby failing to resolve the concentration of stress on the ends of the substrate.

Figure 10:
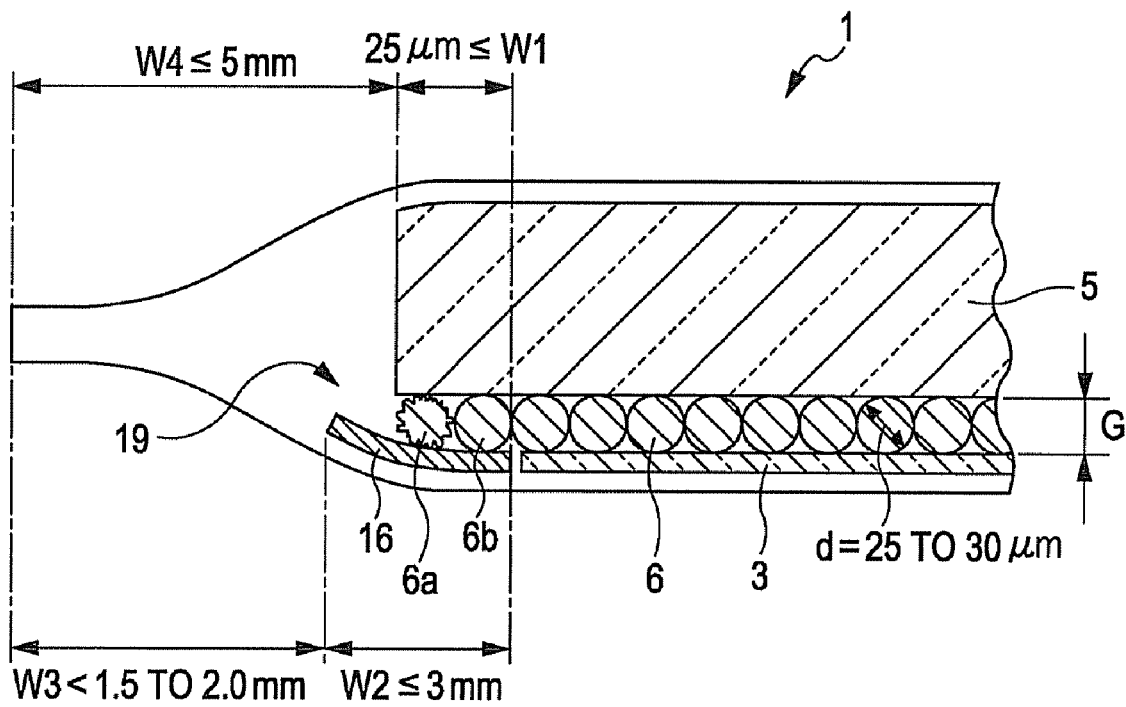
FIG. 10 is a sectional view showing the dimensional relationship of the periphery of an electrophoretic display device.

FIG. 10 is a sectional view showing the dimensional relationship of the periphery of an electrophoretic display device. As shown in FIG. 10, the dummy electrode (spacer) 16 (the same effect as that of a dummy pattern 22 shown in FIG. 4) is preferably provided so that the effective width W1 measured in the radial direction (the horizontal direction of the drawing) of the periphery 19, i.e., an effective width W1 of an overlap between the microcapsules 16 and the dummy electrode 16 in a plan view, is 2 times or more as large as the diameter d (about 25 to 30 µm) of the microcapsules 6. The effective width W1 of the dummy electrode 16 is described below from the viewpoint that many sheets are simultaneously produced from a mother sheet (not shown). In the vicinity of a cut portion (not shown) of each of the sheets cut from the mother sheet, an overlap between the microcapsules 6 and the dummy electrode 16 also has the effective width W1. On the other hand, when the effective width W1 of the dummy electrode 16 is less than 2 times as large as the diameter d of the microcapsules 6, if the mother sheet to which the microcapsules 6 have been applied is cut into a predetermined size at a cutting position corresponding to a portion of the microcapsules 6, some of the microcapsules 6 are crushed, and thus the microcapsule protecting function of the segment electrode groups 2c (FIG. 1) is not exhibited. Namely, it may be necessary that at least one microcapsule 6 is kept normal and uncrushed within the range of the effective width W1 of the dummy electrode 16. Therefore, assuming that some of the microcapsules 6 are crushed in processing the sheet, it may be necessary to secure that the effective width W1 of the dummy electrode 16 is 2 times or more as large as the diameter d of the microcapsules 6.

In this case, if the first microcapsules 6 disposed on the dummy electrode 16 are crushed, the second microcapsules 6 disposed on the segment electrode groups 2c for display are kept uncrushed.

Therefore, it may be possible to resolve a defect such as a display defect caused by crush of the microcapsules 6 due to a change in the gap G between the first and second substrates 3 and 5 in the periphery 19.

Furthermore, the maximum width W2 of the dummy electrode 16 is preferably 3 mm or less. When the maximum width W2 of the dummy electrode 16 exceeds 3 mm, requirements for product project are not satisfied. In other words, the width W4 of an unsightly frame-shaped non-display region is limited to 5 mm or less from the viewpoint of a volume ratio and appearance, and thus if the dummy electrode 16 excessively projects into the seal area with a seal width W3 limited to 1.5 to 2.0 mm, reliability is significantly degraded. In this case, the total of the maximum width W2 of the dummy electrode 16 and the seal width W3 included in the width W4 of the non-display region is preferably decreased so that the display device is suitably used for incorporation into a product such as a watch or the like, which has the property of being required to have a good-looking small size.

As shown in FIG. 1, in the display region 9 of the first substrate 3, a region in which the segment electrodes 2a and 2b are not formed is a background area 15 not contributing to display. The background area 15 includes an outer background area positioned outside the segment electrodes 2a' and 2b', an inner background area positioned in a region surrounded by the four segment electrodes 2a and 2b, and a background area positioned between the segment electrodes 2a and 2b.

Furthermore, the microcapsules 6 are arranged on the dummy electrode 16, but the region on the dummy electrode 16 serves as a portion of the background area not contributing to display because the dummy electrode 16 does not function as an electrode.

On the other hand, the common electrode 4 is formed over the entire surface of the second substrate 5 by vapor deposition or the like.

Examples of a material used for the common electrode 4 include conductive oxides such as ITO (indium tin oxide), electronic conductive polymers such as polyaniline, ionic conductive polymers each including a matrix resin such as polyvinyl alcohol resin or polycarbonate resin in which an ionic substance such as NaCl, $LiClO_4$, or KCl is dispersed.

The microcapsules 6 are disposed between the first and second substrates 3 and 5, particularly on the pixel electrodes 2. As described above, the display material is enclosed in the microcapsules 6, and the microcapsules 6 are formed with substantially the same diameter. In this embodiment, the diameter is about 30 µm. The enclosed display material is changed in optical characteristics in response to an electric impulse and, specifically, the display material is mainly composed of electrophoretic particles or a liquid crystal.

As the material mainly composed of electrophoretic particles, an electrophoretic dispersion liquid containing electrophoretic particles and a liquid phase dispersion medium for dispersing the particles is used.

Examples of the liquid phase dispersion medium include water; alcohol solvents such as methanol, ethanol, isopropanol, butanol, octanol, and methyl cellosolve; esters such as ethyl acetate and butyl acetate; ketones such as acetone, methyl ethyl ketone, and methyl isobutyl ketone; aliphatic hydrocarbons such as pentane, hexane, and octane; alycyclic hydrocarbons such as cyclohexane and methylcyclohexane; aromatic hydrocarbons such as benzene, toluene, xylene, and long-chain alkyl group-containing benzenes, e.g., hexyl benzene, heptylbenzene, octylbenzene, nonylbenzene, decylbenzene, undecylbenzene, dodecylbenzene, tridecylbenzene, and tetradecylbenzene; halogenated hydrocarbons such as methylene chloride, chloroform, carbon tetrachloride, and 1,2-dichloroethane; carboxylates, and other various oils. These compounds are used alone or as a mixture, and a surfactant or the like may be added thereto.

The electrophoretic particles are organic or inorganic particles (polymer or colloid) having the property of being electrophoretically moved by a potential difference in the liquid phase dispersion medium.

Examples of the electrophoretic particles include black pigments such as aniline black, carbon black, and titanium black; white pigments such as titanium dioxide, zinc white, and antimony trioxide; azo pigments such as monoazo, disazo, and polyazo pigments; yellow pigments such as isoindolinone, chrome yellow, and yellow iron oxide, cadmium yellow, titanium yellow, and antimony yellow; red pigments such as quinacridon red and chrome vermilion; blue pigments such as phthalocyanine blue, indanthrene blue, anthraquinone dyes, iron blue, ultramarine blue, and cobalt blue; and green pigments such as phthalocyanine green. These pigments may be used alone or combination of two or more.

Furthermore, if required, a charge control agent such as an electrolyte, a surfactant, a metal soap, a resin, rubber, oil, varnish, or a compound; a dispersant such as a titanium coupling agent, an aluminum coupling agent, or a silane coupling agent; a lubricant, and a stabilizer may be added to the pigment.

As a material for forming the wall films of the microcapsules 6, a composite film of rubber Arabic and gelatin, or a compound such as urethane resin or urea resin may be used.

In the electrophoretic display device 1 according to this embodiment, two types of electrophoretic particles are enclosed in the microcapsules 6, one of the types being negatively charged, and the other being positively charged. As the two types of electrophoretic particles, for example, a white pigment, e.g., titanium dioxide, and a black pigment, e.g., carbon black, are used. By using the two types of electrophoretic particles, i.e., white and black pigments, for example, a numeral may be displayed using the black electrophoretic particles.

Display may be performed by migration of only one type of electrophoretic particles toward the common electrode side or the pixel electrode side.

The microcapsules 6 are fixed to the second substrate, particularly on the common electrode 4, with a binder 10. As the binder 10, a material having high affinity for the wall films of the microcapsules 6, excellent adhesion to the common electrode 4, and insulation may be used. Examples of such a material include thermoplastic resins such as polyethylene, chlorinated polyethylene, ethylene-vinyl acetate copolymers, ethylene-ethyl acrylate copolymers, polypropylene, ABS resin, methyl methacrylate resin, vinyl chloride resin, vinyl chloride-vinyl acetate copolymers, vinyl chloride-vinylidene chloride copolymers, vinyl chloride-acrylate copolymers, vinyl chloride-methacrylic acid copolymers, vinyl chloride-acrylonitrile copolymers, ethylene-vinyl alcohol-vinyl chloride copolymers, propylene-vinyl chloride copolymers, vinylidene chloride resin, vinyl acetate resin, polyvinyl alcohol, polyvinyl formal, and cellulose resin; polymers such as polyamide resin, polyacetal, polycarbonate, polyethylene terephthalate, polybutylene terephthalate, polyphenylene oxide, polysulfone, polyamidemide, polyaminobismaleimide, polyether sulfone, polyphenylene sulfone, polyallylate, grafted polyphenylene ether, polyether ethyl ketone, and polyether imide; fluorocarbon resin such as polytetrafluoroethylene, polyfluoroethylene propylene, tetrafluoroethylene-perfluoroalkoxyethylene copolymers, ethylene-tetrafluoroethylene copolymers, polyvinylidene fluoride, polytrifluoroethylene chloride, and fluororubber; silicone resin such as silicone resin and silicone rubber; other polymers such as methacrylic acid-styrene copolymers, polypropylene, and methyl methacrylate-butadiene-styrene copolymers.

On the other hand, the microcapsules 6 are fixed to the first substrate 3, particularly on the pixel electrodes 2, with a double-faced adhesive sheet 11. The double-faced adhesive sheet 11 is a rubber or acrylic adhesive sheet having a thickness of about 25 μm and is fixed to the pixel electrodes 2 of the first substrate 3 and to the microcapsules 6, thereby fixing the microcapsules 6 on the first substrate 3.

Therefore, the microcapsules 6 are held between the first substrate 3 and the second substrate 5 to form the display region 9.

As shown in FIG. 2, the conductive portion 7 is formed in the display region 9 of the first substrate 3. As shown in FIG. 1, a conductive material 17 is formed on the conductive portion 7 and put into electric contact with the common electrode 4 of the second substrate 5. As a result, in this embodiment, the conductive portion 7 and the conductive material 17 constitute a vertical conduction member 12 for vertical conduction between the first and second substrates 3 and 5.

The conductive portion 7 includes a copper foil pattern formed by, for example, a semi-additive method. Therefore, the conductive portion 7 may be formed using the same material in the same process as that for the segment electrodes 2a and 2b and the dummy electrode 16.

The conductive material 17 includes conductive paste prepared by mixing conductive particles such as metal particles, e.g., silver or nickel particles formed by fracture, carbon particles, particles each including a resin core coated with nickel and further coated with gold, in a resin, for example, an epoxy resin, or a conductive sheet formed using the conductive paste. In particular, as the resin, rubber or acrylic resin which has adhesiveness at room temperature is preferably used.

As shown in FIGS. 2A and 2B, a pair of waterproof sheets 14 is laminated on the outside of the display element 20 so as to sandwich the display element 20. Therefore, the whole of the display element 20 is covered with the pair of waterproof sheets 14. Furthermore, attachment portions 14c are provided in the peripheries of the pair of waterproof sheets 14, the attachment portions 14c being formed to be larger than the outer sizes of the first and second substrates 3 and 5. The attachment portions 14c of the waterproof sheets 14 are bonded together through an adhesive 18 in the side ends of the display element 20.

Each of the waterproof sheets 14 has a two-layer structure including a resin layer 14a composed of a polymer material and a barrier layer 14b composed of an inorganic material. In sealing the pair of substrates with the waterproof sheets 14, the barrier layer 14b of each waterproof sheet 14 is disposed nearer to the substrate side (inside) than the resin layer 14a. When the barrier layers 14b are disposed outside, moisture may enter the inside through the defects produced in the barrier layers 14b. On the other hand, when the barrier layers 14b of the waterproof sheets 14 are disposed nearer to the substrate side than the resin layers 14a, if defects occurs in the barrier layers 14b, the entrance of moisture from the outside may be cut off by the outer resin layers 14a. Furthermore, in order to increase waterproofness, the resin layer 14a and the barrier layer 14b may be alternately laminated to form a multilayer waterproof sheet, thereby further increasing the effect of cutting off moisture entrance from the outside.

As a material for the barrier layers 14b, an inorganic material such as silicon oxide, silicon nitride, aluminum oxide, or titanium oxide, or a metal foil such as an aluminum foil, a copper foil, or a Koval foil is preferably used.

As a material for the resin layers 14a, a polyester such as polyethylene terephthalate (PET), polyethylene (PE), polypropylene (PP), polyether sulfone (PES), or polyethylene naphthalate (PEN), a resin such as polycarbonate (PC), a metal foil such as an aluminum foil, a copper foil, a Koval foil, or a laminate of a metal thin film and a resin film is preferably used.

The adhesive 18 is applied to the side ends of the display element 20 so that the space between the first and second substrates 3 and 5 is sealed with the adhesive 18. As a material for the adhesive 18, a resin adhesive such as an epoxy resin, a silicone resin, or an acrylic resin, or such a resin adhesive containing an inorganic filler such as silicon nitride or the like is preferably used.

In this embodiment, the dummy electrode 16 is formed along the periphery of the segment electrode groups 2c, and thus the step formed by the segment electrodes 2 and the substrate surface on which the segment electrodes are not provided is relieved by the dummy electrode 16. Therefore, the space between the second substrate 5 and the microcapsules 6 disposed in the periphery between the pair of substrates 3 and 5 is filled. Thus, when the display element 20 is sealed with the waterproof sheets 14, the periphery of the second substrate 5 is supported by the segment electrodes 2 and the microcapsules 6, thereby decreasing the stress concentration in the substrate periphery during compression (drawing) of the waterproof sheets 14. As a result, it may be possible to prevent the deformation of the peripheries of the first and second substrates 3 and 5, prevent crush of the microcapsules 6 disposed between in the periphery between the first and second substrates 3 and 5, and resolve a display defect in the periphery of the display region.

In this embodiment, the dummy electrode 16 is formed using the same material as that of the segment electrodes 2, thereby decreasing the material cost. Furthermore, the dummy electrode 16 may be formed in the same process as that for the segment electrodes 2, and thus a process for forming the dummy electrode 6 (spacer) need not be added.

(Method for Manufacturing Electrophoretic Display Device)

Next the method for manufacturing the electrophoretic display device according to this embodiment will be described with reference to FIGS. 3A to 3D. FIGS. 3A to 3D are sectional views showing the process for manufacturing the electrophoretic display device 1.

First, as shown in FIG. 3A, the first substrate 3 composed of elastically deformable polyimide and having a thickness of about 25 µm is prepared, and the pixel electrodes 2 (segment electrodes) and the dummy electrode 16 are simultaneously formed in the display region 9 of the first substrate 3 by a known method such as a semi-additive method.

Also, as shown in FIG. 3B, the second substrate 5 composed of polyethylene terephthalate (PET) and having a thickness of 200 µm is prepared. Then, a transparent electrode (the common electrode 4) composed of ITO is formed to a thickness of several hundreds Å over the entire surface of one (inner side) of the surfaces of the second substrate 5.

Next, as shown in FIG. 3B, many microcapsules 6 are arranged on the surface of the common electrode 4 of the second substrate 5 using the binder 10. Each of the microcapsules 6 contains black and white particles which are positively and negatively charged, respectively, together with a solvent, the diameter of the microcapsules 6 being 30 to 50 µm. Then, a double-faced adhesive sheet (not shown) is attached to the surfaces of the microcapsules on the side opposite to the side bonded to the second substrate 5.

Next, the second substrate 5 to which the double-faced adhesive sheet has been attached is opposed to the first substrate 3. As shown in FIG. 3C, the double-faced adhesive sheet of the second substrate 5 is pressed and bonded to the side of the first substrate 3 on which the pixel electrodes 2 have been formed to fix the pair of substrates. As a result, the display element 20 is formed, in which the microcapsules are held between the first and second substrates 3 and 5. The substrates are basically fixed by adhesion of double-faced adhesive sheet at room temperature without heating. If required, heating may be performed so as not to adversely affect the microcapsules 6.

Next, as shown in FIG. 3D, an adhesive is injected, from the peripheral side, into the side end of the display element 20, including the space between the first and second substrates 3 and 5, using a disperser or the like. As a result, the adhesive is disposed to surround the outside of the display region 9. Then, the adhesive is cured to form the adhesive layer 13 and to obtain the electrophoretic display device 1. As the adhesive, an ultraviolet curable type which is cured without heating is used. However, like in adhesion of the double-faced adhesive sheet, an adhesive which is cured by heating within a range causing no adverse effect on the microcapsules 6 may be used.

Second Embodiment

A second embodiment will be described with reference to the drawings.

In the first embodiment, the dummy electrode 16 composed of the same material as that of the pixel electrodes is formed as the spacer for filling the step. However, the second embodiment is different from the first embodiment in that a solder resist is used as a spacer for protecting lead wiring or the like. The other basic components of an electrophoretic display device are the same as in the first embodiment. The common components are denoted by the same reference numerals, and the detailed description thereof is omitted.

Figure 4:
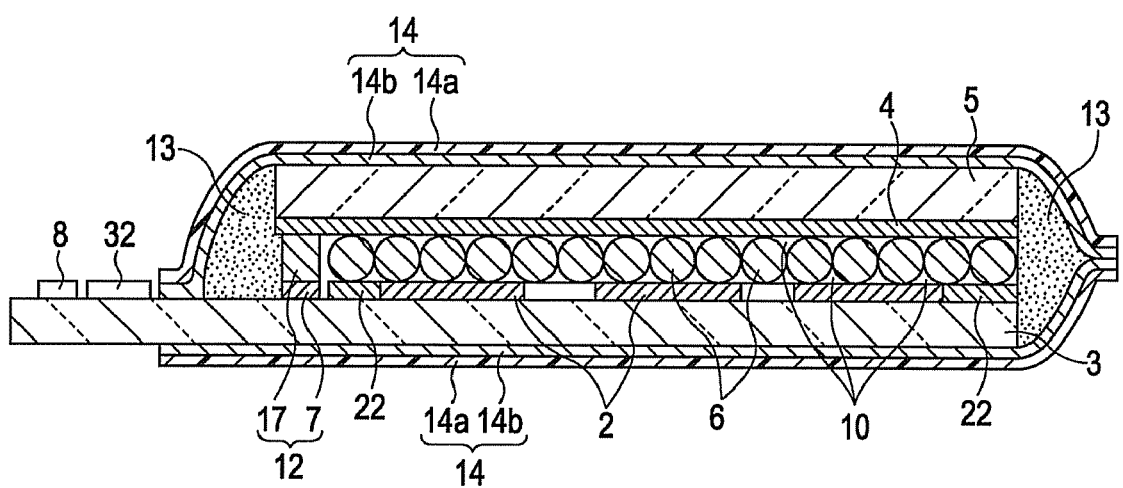
FIG. 4 is a sectional view showing the schematic configuration of an electrophoretic display device according to a second embodiment of the invention.

FIG. 4 is a sectional view showing the schematic configuration of an electrophoretic display device in which a dummy pattern 22 is formed. As shown in FIG. 4, the terminals 8 are formed in the projecting portion 3a of the first substrate 3, for mounting FPC. In addition, a solder resist (not shown) is disposed in the periphery of the terminals 8, for preventing the adhesion of an adhesive material to an unnecessary portion during mounting of a FPC substrate.

Furthermore, lead wiring (not shown) is formed on the projecting portion 3a, for connecting the terminals 8 and the electrodes 2 and 4 of the display region 9. The solder resist 32 is disposed on the lead wiring, for protecting the lead wiring. As a material for the solder resist 32, for example, an epoxy, phenolic, or urethane material can be used. However, an epoxy material is preferably used from the viewpoint of strength.

In this embodiment, the dummy pattern 22 (spacer) is formed in the space S between each side (peripheral edge) of the first substrate 3 and the outer segment electrodes 2a' and 2b' in the three segment electrode groups 2c. The dummy pattern 22 includes the solder resist 32 disposed in the periphery of the projecting portion 3a and on the lead wiring. Therefore, the dummy pattern 22 is formed in the same process as that for disposing the solder resist 32 in the periphery of the terminals 8 and on the lead wiring in the projecting portion 3a. In this case, the solder resist 32 is composed of an insulating material, and thus the solder resist 32 may be in contact with the segment electrodes 2 formed in the display region 9.

In this embodiment, the dummy pattern 22 may be formed using the same material as that for the solder resist 32 provided in the projecting portion 3a, thereby decreasing the material cost. Furthermore, the dummy pattern 22 may be formed in the same process as that for the solder resist 32, and thus another process for forming the dummy pattern 22 need not be added.

Although, in this embodiment, the dummy pattern 22 is formed using the same material as that for the solder resist 32 disposed in the projecting portion 3a, a material different from the above-described material to be disposed on the projecting portion 3a may be used for forming the dummy pattern 22. Alternatively, an insulating material different from the material disposed on the projecting portion 3a may be used for forming the dummy pattern 22.

Third Embodiment

Next, a third embodiment will be described with reference to the drawings.

The third embodiment is different from the first embodiment in that a copper pattern 24 and a resist film 26 are formed on the outer surface of at least one of first and second substrates 3 and 5. The other basic components of an electrophoretic display device are the same as in the first embodiment. The common components are denoted by the same reference numerals, and the detailed description thereof is omitted.

Figure 5A:
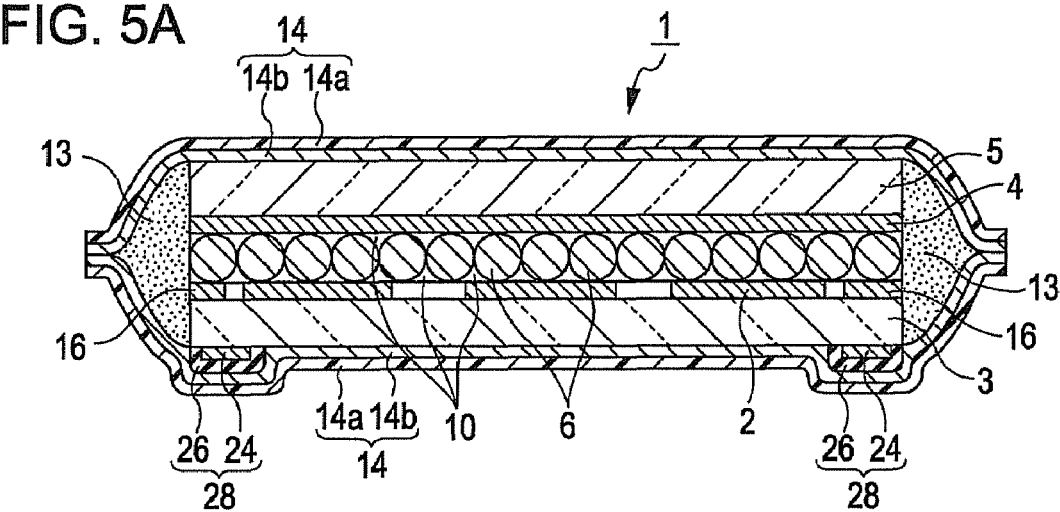
FIGS. 5A and 5B are sectional views showing the schematic configuration of an electrophoretic display device according to a third embodiment of the invention.
Figure 5B:
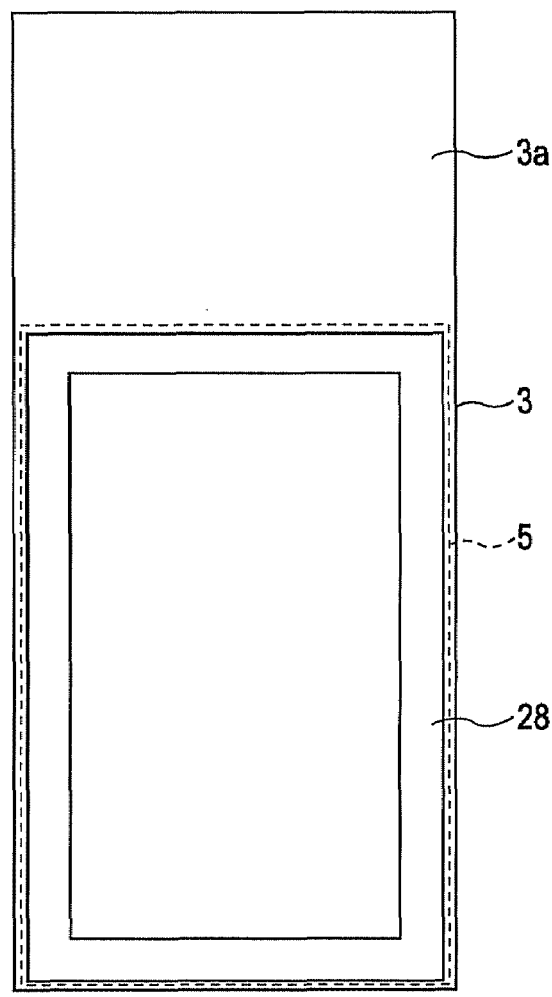

FIGS. 5A and 5B are sectional views showing the schematic configuration of an electrophoretic display device 1 in which a reinforcing member 28 is formed.

The reinforcing member 28 is formed on the outer surface of the first substrate 3, for improving rigidity of the first substrate 3. As shown in FIGS. 5A and 5B, the reinforcing member 28 is formed so as to partially planarly overlap the dummy electrode 16 (dummy pattern 22) formed on the inner surface of the first substrate 3. In this embodiment, like the dummy electrode 16, the reinforcing member 28 may be formed over the whole periphery at the corresponding position of the outer surface of the first substrate 3 or formed in a portion of the periphery at the position of the first substrate 3.

The reinforcing member 28 includes a laminate of a copper pattern 24 (conductive member) composed of a conductive material such as copper and a resist film 26 (insulating film) covering the copper pattern 24. The copper pattern 24 is formed using the same material as that for the segment electrodes 2 formed on the first substrate 3. The width of the copper pattern 24 is preferably about 0.5 mm or more, and the thickness of the copper pattern 24 is preferably about 18 μm or more. The resist film 26 is formed using the same material as that for the solder resist 32 for protecting the lead wiring formed on the first substrate 3. The width of the resist film 26 is preferably about 0.5 mm or more, and the thickness of the resist film 26 is preferably about 15 μm or more.

In this embodiment, the material of the reinforcing member 28 is the same as that for the segment electrodes 2a and 2b and the solder resist 32 provided on the facing surface of the first substrate 3, thereby decreasing the material cost. Furthermore, the reinforcing member 28 has a two-layer structure including the copper pattern 24 and the resist film 26, thereby further improving the rigidity of the substrate.

Therefore, it may be possible to decrease stress concentration in the substrate periphery during compression (drawing) of the waterproof sheets 14, prevent crush of the microcapsules 6 disposed in the periphery between the first and second substrates 3 and 5, and resolve a display defect in the periphery of the display region 9.

Even when the reinforcing member 28 includes a single layer of the copper pattern 24 or the resist film 26, the substrate rigidity is improved.

Although, in this embodiment, the copper pattern 24 and the resist film 26 are formed only on the outer surface of the first substrate 3, the copper pattern 24 and the resist film 26 may be formed only on the outer surface of the second substrate 5. Alternatively, the copper pattern 24 may be formed on both substrates 3 and 5.

When the electrophoretic display device 1 is mounted on an electronic apparatus body, the copper pattern 24 may be allowed to function as wiring for electrically connecting the electrophoretic display device 1 and the electronic apparatus body.

Electronic Apparatus

Next, an electronic apparatus according to an embodiment of the invention will be described. An electronic apparatus according to an embodiment of the invention includes the above-described display device.

Examples of an electronic apparatus including the display device will be described below.

<Wristwatch>

Figure 6:
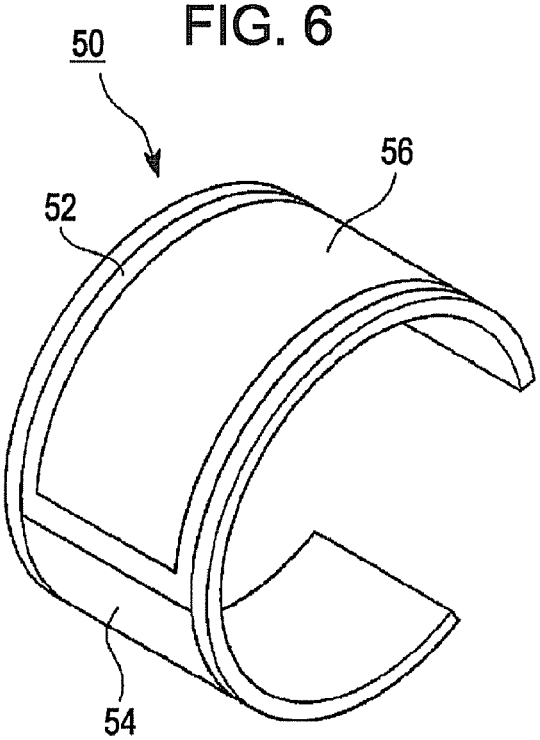
FIG. 6 is a perspective view showing the schematic configuration of a wristwatch.

Description will be first made of an example in which the electrophoretic display device is applied to a display portion of a wristwatch. FIG. 6 is a perspective view showing the schematic configuration of a wristwatch 50. As shown in FIG. 6, the wristwatch 50 includes a display portion 56 for displaying times, a watchcase 52 provided as a frame of the display portion 56, and a watchband 54 attached to the watchcase 52. In the wristwatch 50, the display portion 56 is curved so as to be wound on the arm of the user of the wristwatch 50.

<Cellular Phone>

Figure 7:
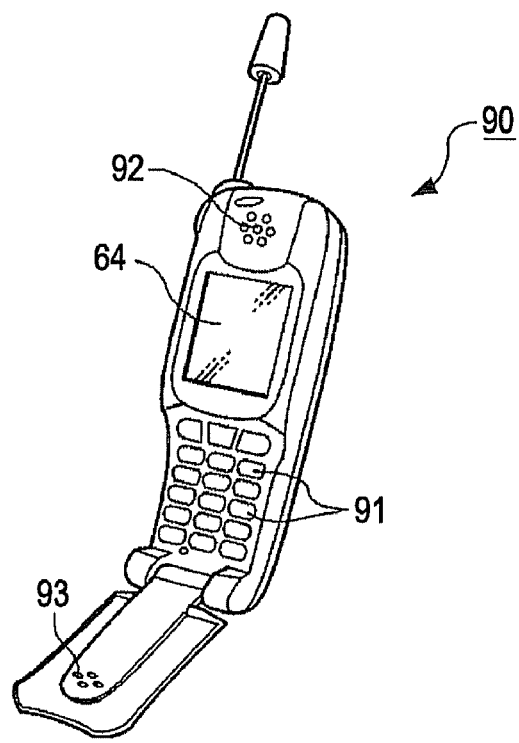
FIG. 7 is a perspective view showing the schematic configuration of a cellular phone.

Next, description will be made of an example in which the electrophoretic display device is applied to a display portion of a cellular phone. FIG. 7 is a perspective view showing the configuration of a cellular phone 90. As shown in FIG. 7, the cellular phone 90 includes a plurality of operation buttons 91, an earpiece 92, a mouthpiece 93, and a display device 64.

<Electronic Paper>

Figure 8:
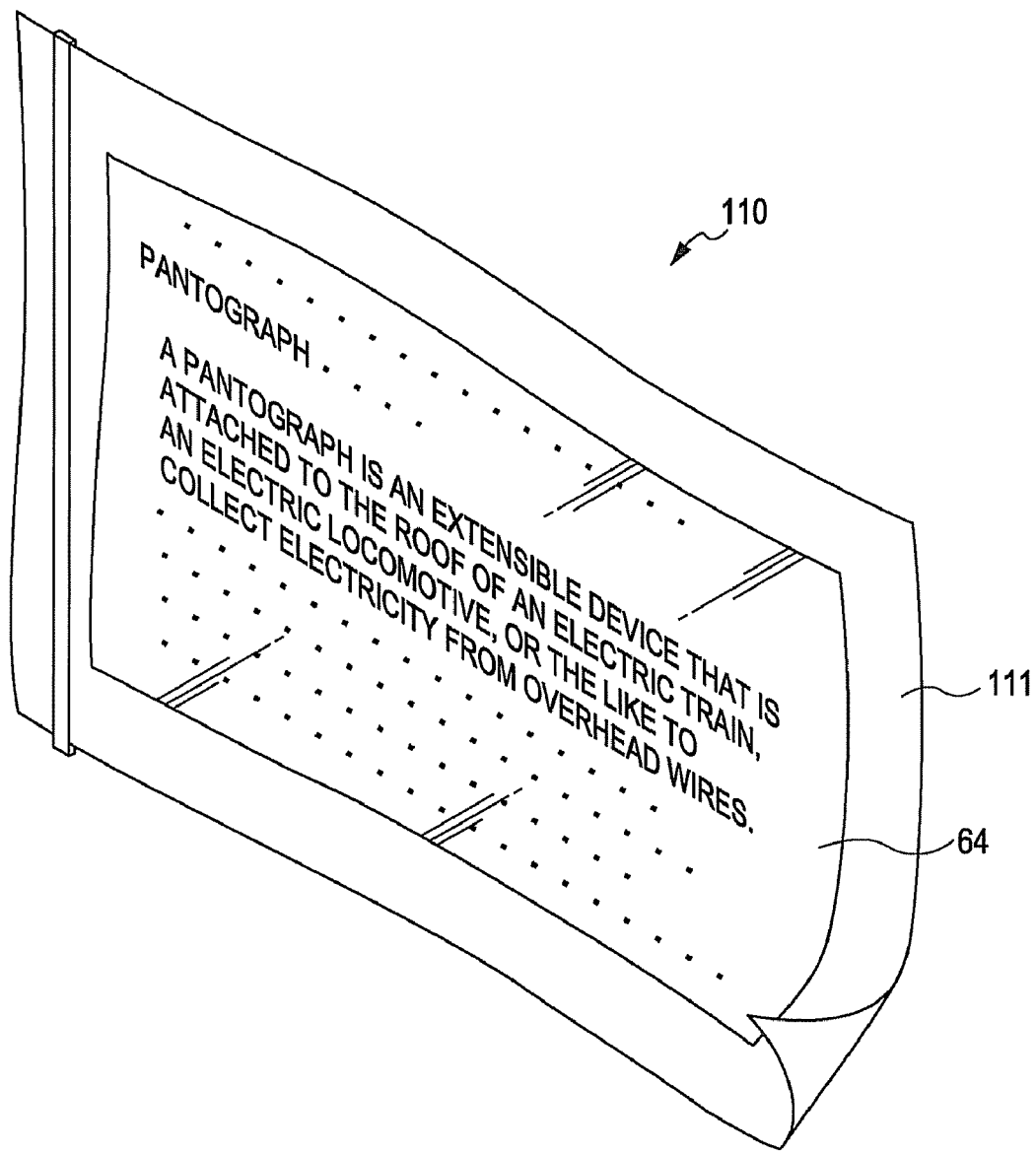
FIG. 8 is a perspective view showing the schematic configuration of an electronic paper.
Figure 9:
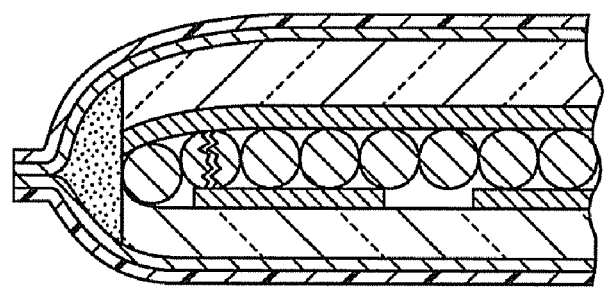
FIG. 9 is a sectional view showing the schematic configuration of a general electrophoretic display device.

Next, description will be made of an example in which the electrophoretic display device is applied to a display portion of an electronic paper. FIG. 8 is a perspective view showing the configuration of an electronic paper 110. The electronic paper 110 includes a body 111 composed of a rewritable sheet having the same texture and flexibility as paper, and a display unit including the display device 64.

These electronic apparatuses each include the electrophoretic display device 1 without a display defect and thus have high reliability and high quality.

Besides the wristwatch shown in FIG. 6, the cellular phone shown in FIG. 7, and the electronic paper shown in FIG. 8, examples of the electronic apparatus include an IC card including the display device provided in a display portion and a fingerprint detection sensor, an electronic book, a view finder-type or direct view-type video tape recorder, a car navigation system, a pager, an electronic notebook, an electric calculator, a word processor, a work station, a picture telephone, a POS terminal, and an apparatus with a touch panel. The display device may be applied as a display portion for any one of these electronic apparatuses.

The technical field of the invention is not limited to the above-described embodiments, and various changes of the embodiments may be made within the gist of the invention.

In each of the embodiments, the dummy electrode (dummy pattern) is formed in a frame shape along the periphery of the segment electrodes. However, when the dummy electrode is formed in at least a portion of the periphery of the segment electrodes, it may be possible to decrease stress concentration in the substrate ends and prevent crush of the microcapsules disposed in the periphery of the pixel electrodes.

In addition, as a driving system for an electrophoretic display device, a segment type, an active matrix type, or a passive matrix type may be used.

Furthermore, in each of the embodiments, a segment electrode group includes seven segment electrodes. However, the segment electrode group is not limited to this, and the segment electrode group 2c may include 14 or 16 segment electrodes. In addition, the arrangement pattern of the segment electrodes is not limited to the arrangement patterns of the embodiments.

What is claimed is:

1. An electrophoretic display device comprising:
a pair of first and second substrates which are opposed to each other;

microcapsules enclosing a display material, the microcapsules being sandwiched between the first and second substrates;

a protective film sealing the first and second substrates;

a first electrode provided between the first substrate and the microcapsules;

a second electrode provided between the second substrate and the microcapsules; and a spacer provided between an edge of the first substrate and the first electrode, wherein one of the microcapsules is disposed between the first electrode and the second electrode and another of the microcapsules is disposed between the spacer and the second electrode.

2. The electrophoretic display device according to claim 1, wherein the thickness of the spacer is in the range of 50% to 150% of the thickness of the first electrode.

3. The electrophoretic display device according to claim 1, wherein the width of the spacer measured in the radial direction of the periphery is 2 times or more as large as the diameter of the microcapsule.

4. The electrophoretic display device according to claim 1, wherein the width of the spacer is 3 mm or less.

5. The electrophoretic display device according to claim 1, wherein the first electrode is a pixel electrode, the second electrode is a common electrode, the pixel electrode includes a plurality of segment electrodes arranged in a predetermined pattern, and the spacer is provided in the periphery of the outer segment electrodes among the plurality of segment electrodes.

6. The electrophoretic display device according to claim 1, wherein the spacer is composed of the same material as that of the pixel electrode.

7. The electrophoretic display device according to claim 1, wherein the first substrate has a projecting portion projecting from the outer shape of the second substrate, a terminal portion is provided in the projecting portion, an insulating film is provided on the projecting portion except on at least the terminal portion, and the spacer is composed of the same material as that of the insulating film.

8. The electrophoretic display device according to claim 1, wherein a reinforcing member is provided on the surface of at least one of the first and second substrates, which is opposite to the facing surface, so that the reinforcing member planarly overlaps at least a portion of the spacer on the facing surface of the first substrate.

9. The electrophoretic display device according to claim 8, wherein the reinforcing member includes at least one of a conductive member composed of the same material as that of the pixel electrode provided on the facing surface side of the first substrate and a protective member composed of the same material as that of the insulating film.

10. An electronic apparatus comprising the electrophoretic display device according to claim 1.

* * * * *